Figure 1:

(No Model.)

J. KIRKMAN.
Packing for Steam and other Joints.

No. 237,548. Patented Feb. 8, 1881.

Attest:
Sidney P. Hollingsworth
William W. Dodge.

Inventor:
Jesse Kirkman
By Dodge Son,
Attys.

UNITED STATES PATENT OFFICE.

JESSE KIRKMAN, OF CHORLEY, COUNTY OF LANCASTER, ENGLAND.

PACKING FOR STEAM AND OTHER JOINTS.

SPECIFICATION forming part of Letters Patent No. 237,548, dated February 8, 1881.

Application filed November 22, 1880. (No model.)

*To all whom it may concern:*

Be it known that I, JESSE KIRKMAN, of Chorley, in the county of Lancaster and Kingdom of England, have invented certain new and useful Improvements in Packing for Steam and other Joints; and I do hereby declare that the following is a full, clear, and exact description of the invention, which will enable others skilled in the art to which it appertains to make and use the same.

Asbestus packings for joints are usually cut out of asbestus mill-board, and, being annular, the centers and spaces between the various rings are in a great measure cut to waste.
Water, too, soaking through from the center, has a tendency to convert the asbestus into a kind of ooze or pulp, and in making the joint the asbestus is very liable to spread inward. Packings have also been made with fibrous asbestus that will bend round; but this is much inferior for the purpose and more expensive than mill-board asbestus.

Now, my invention is designed to make packings of mill-board asbestus without waste of cuttings, and, secondly, to so combine lead with the asbestus that the former shall prevent the latter being squeezed inward unduly when making the joint. To do this I build up the packing-ring from mill-board by soaking the mill-board in water, and when pliable and somewhat plastic forming the ring by binding it round a mandrel. For this purpose I usually mold, cut, and splice or roll the wet millboard into long strips or thin rolls. On one side, preferably the side forming the interior edge of the packing before being formed into rings, I usually place a long strip of lead or equivalent soft alloy. The combined strip of lead and mill-board I bandage over, when dry, with cloth, or I braid it round with yarn, (preferably cotton yarn,) several strands being wound on each bobbin in the braiding-machine, so as to make quicker and more open work. The braided strips are then damped and pressed into shape round a mandrel, and the lead soldered or not, as desired. The asbestus rings are preferably spliced and secured with a solution of india-rubber or the joint well wrapped with yarn. The whole is then pressed flat in such manner as to leave the lead ring inside the asbestus ring, and when dry is ready for market. These rings can, if desirable, be made in the following way instead: A sheet of lead is bent round a mandrel and soldered to form a tube. Sheet or mill-board asbestus, smeared with glue, is then wrapped round the lead until the required thickness is obtained. It is then covered with cloth, glued round, and the whole left to dry. When dry it is cut in a lathe into a series of washers or rings—say one-eighth to three-sixteenths of an inch thick. When required to stand rough usage each ring is covered with cloth or yarn, wound round by hand, and is then ready for market; but if not liable to rough usage, the covering of yarn or cloth can with safety be dispensed with.

Figure 2:
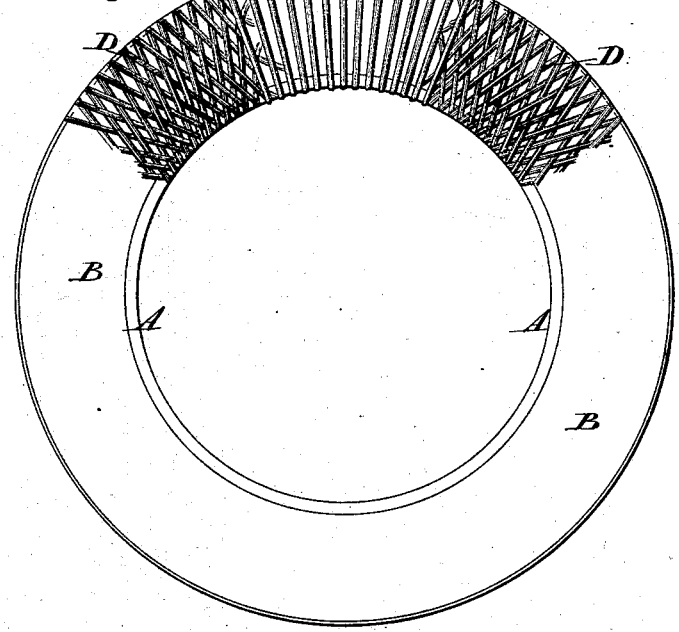
Figure 3:
Figure 4:
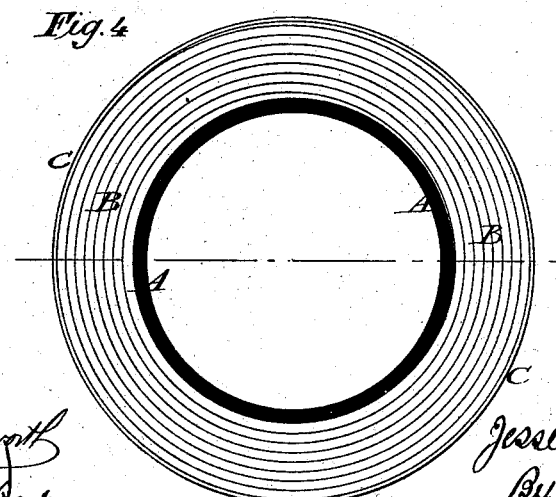

In the drawings, Figure 1 shows an elevation of a ring of packing; Fig. 2, a plan; Figs. 3 and 4, section and plan of a ring without the braiding, when built upon a mandrel pipe fashion and cut into washers.

Like letters in each figure denote corresponding parts.

In these, A is the lead ring; B, asbestus; C, cloth binding, (only shown in Figs. 3 and 4;) D, braiding round the ring, (shown only partially covering it, for convenience, in Figs. 1 and 2, and left out altogether in Figs. 3 and 4.)

In applying these rings they are first soaked in water, (or preferably boiled linseed-oil,) then placed in the joint to be secured and tightly screwed up.

I am aware that asbestus has been heretofore employed in the manufacture of steam-packing; that strips of asbestus and asbestusboard have been placed parallel to each other and confined by winding or braiding cord around them, and also that strips or pieces of asbestus have been rolled or twisted around a core composed of cork, compressed asbestus, or like material. I believe myself, however, to be the first to wind asbestus mill-board around a core, then knit or wind thread or yarn over the same, and subsequently subject the covered body to compression. I believe myself to be the first to produce a packing composed of wound asbestus strips covered with yarn and solidified by compression.

I claim as my invention—

1. A packing composed of asbestus millboard wound into form, covered with thread or yarn, and compressed into a hard solid mass, as shown and described.

2. As a new article of manufacture, a packing for joints, consisting of a lead ring surrounded by an asbestus ring made of or built up of asbestus mill-board.

3. As a new article of manufacture, a packing for joints, consisting of asbestus mill-board and lead in parallel bands, braided over and then bent to shape in a damp state.

4. The process of manufacturing packing, consisting in winding or forming asbestus mill-board into bodies of the sectional area required, braiding yarn over and around them, dampening them, and finally pressing them into shape.

5. The process of manufacturing packing for joints, consisting of bending a sheet of lead round a mandrel, winding asbestus mill-board smeared with glue round it, covering with cloth glued on, drying, and then turning the roll thus formed into washers or packing of the required thickness.

6. The combination, in packing for joints, of the mill-board asbestus molded or pressed into a ring, B, and the braiding D round the same.

7. The combination, in packing for joints, of the lead ring A, formed of a sheet of lead bent round a mandrel and soldered, the asbestus B, formed of mill-board wound with glue tightly round the lead, and the cloth C, glued over all, so as to resist the centrifugal force in turning.

JESSE KIRKMAN.

Witnesses:
WM. P. THOMPSON,
JOHN HAYES.